July 2, 1963   J. D. LONG   3,096,460
CIRCUIT FOR MAINTAINING A PREDETERMINED PHASE
RELATIONSHIP BETWEEN TWO VOLTAGE WAVES
Filed April 13, 1960

INVENTOR.
JAMES D. LONG

United States Patent Office 3,096,460
Patented July 2, 1963

3,096,460
CIRCUIT FOR MAINTAINING A PREDETERMINED PHASE RELATIONSHIP BETWEEN TWO VOLTAGE WAVES
James D. Long, North Hollywood, Calif., assignor, by mesne assignments, to the United States of America as represented by the Secretary of the Navy
Filed Apr. 13, 1960, Ser. No. 22,069
3 Claims. (Cl. 315—23)

The present invention relates to electrical circuits of the type utilized in cathode-ray tube display systems, and, more particularly, to an arrangement for causing the electron scanning beam of a cathode-ray tube to describe and maintain a particular pattern on the tube's fluorescent screen.

It is well known that in either electrostatically or electromagnetically deflected cathode-ray tubes, it is possible to obtain a frequency comparison between two electrical waves of the same amplitude by respectively applying such waves to the two sets of deflecting coils or plates. When both waves are of the same frequency, for example, the trace produced by the scanning beam is in the form of an ellipse if there is a phase difference between the voltages, and in the nature of a straight line when an in-phase condition exists. A 90° phase displacement yields a trace of circular configuration. If one of the voltage waves is of known frequency and the other unknown, the latter may, in many cases, be calibrated against the known to produce one of the patterns mentioned. For such a figure to be stationary, however, the frequencies of the respective voltages must exhibit a simple integral (whole number) relationship with respect to one another. Many variations of these geometrical displays, known as Lissajou figures, are familiar to workers in this art.

Although a common use of such arrangements is for frequency and/or phase comparison of an unknown wave with a standard or reference voltage, an application of this principle which is becoming of increasing importance is that of producing a symbol on the screen of a cathode-ray tube which yields significant information to an observer in the sense that it distinguishes the character of one particular indication or marker on the tube screen from that of indications appearing at other places thereon. For example, in the rapidly developing field of military radar, which includes the identification of objects located by the radar not only according to their positional characteristics, but also in accordance with the relative change in this position as a function of time, it is highly desirable to apply to each moving object or target within the radar range, some particular property which causes such moving target to stand out from targets of a stationary nature which may also appear on the radar scope. This enables an observer to instantly initiate whatever action may appear to be called for in view of the situation presented without incurring the delay which would otherwise result from making a determination that such target does indeed possess motion by waiting for a change in its indicated position on the cathode-ray tube screen.

One manner in which the identification of moving targets is made on a radar indicator is to cause the marker representing such moving target to be encircled by the scanning beam whereas non-moving targets are not so distinguished. This readily separates the two types of markers and greatly facilitates a rapid "reading" of the video map, which may in many instances contain a large number of illuminated areas representing nothing more significant than ground clutter.

Since the presentation of visual information in such a radar system is customarily carried out on a time-sharing basis, it is possible to devote a portion of each complete video cycle to the formation by the cathode-ray scanning beam of the symbol or symbols to be used in identifying any moving target or targets. In other words, the scanning beam of the cathode-ray tube may be sequentially gated during each cycle to different output circuits of the radar receiver, at least one of which may be of a symbol-generating type. If the phosphor screen of the tube possesses a sufficiently long persistence factor, the sequential production of different aspects of the video map or picture will not preclude the concurrent presentation of these various aspects to an observer. For example, the location of a target may be indicated by the cathode-ray beam at some particular instant of time, following which the beam may be caused to trace a symbol indicative of some particular characteristic of such target. The number of items of information which can be so presented obviously depends upon the amplitude of the output signals, the switching limitations of the associated gating circuitry, and the composition of the fluorescent screen.

When a selected target or object is to be in some way identified on a cathode-ray tube screen by a symbol or character, it is essential that this identifying marker remain unchanged in form throughout the period of presentation. This is especially true when a number of symbols are employed to designate targets of widely dissimilar nature. Any variation in the size, shape, or geometric outline of a symbol raises the possibility of confusion between it and another symbol being utilized to identify objects picked up by the radar which are of a completely different type. Hence, the consistency of presentation of each symbol selected for use is of major importance.

When moving targets are to be identified on a radar scope by pin-pointing the marker representing each such target within a circle of relatively small diameter, the circle is frequently developed by respectively applying to the two sets of reflecting plates of the cathode-ray tube a pair of sine-wave voltages possessing a phase displacement of 90°. The position on the fluorescent screen of the resulting circle traced by the cathode-ray beam is a function of the D.-C. bias on the plates, and is usually determined by complex computer circuitry with which the present invention is in no way concerned. However, the two sine-wave voltages employed to generate the circular trace must have a phase relationship which is critical in the sense that any departure from 90° results in a distortion of the circular trace into that of an ellipse. Since the latter symbol is also frequently employed to identify objects of a completely different type, it is essential that no ambiguity exist therebetween.

Many circuits now employed to generate such circular traces on a screen of a cathode-ray tube possess the disadvantage of being inherently incapable of establishing and/or maintaining an exact 90° phase displacement between two sine-wave voltages of equal amplitude. This may be due, for example, to a lack of precise synchronization between the oscillatory portions of the respective wave-generating circuits, or to the use of components which are subject to frequency drift with increasing age, variations in temperature, etc. Unless compensation for these and other factors is made, the visual display becomes less than ideal and may, in extreme cases, actually become ambiguous as to the nature of the information being presented.

According to a principal feature of the present invention, means are provided whereby an exact 90° phase relationship between two sine-wave voltages may be maintained through the use of synchronizing signals in the form of two phase-related rectangular waves having a common origin. These synchronizing signals are utilized to "lock" the two sine-wave oscillators in step with one another insofar as operating frequency is concerned, but, since the rectangular synchronizing waves are phase-displaced by 90°, the respective sine-wave outputs from the oscillators will be similarly related. Thus the waves are suitable for the generation of a trace of exactly circular configuration on the screen of a cathode-ray tube.

One object of the present invention, therefore, is to provide an improved circuit for causing the electron scanning beam of a cathode-ray tube to describe and maintain a particular pattern on the tube's fluorescent screen.

Another object of the invention is to provide a sine-wave generating network in which two output waves are maintained in a predetermined phase relationship.

A further object of the invention is to provide an electrical circuit arrangement for permitting frequency and/or phase comparison between two sine-waves which are respectively applied to the deflecting elements of a cathode-ray tube.

Other objects and many of the attendant advantages of this invention will be readily appreciated as the same become better understood by reference to the following detailed description when considered in connection with the accompanying drawings wherein.

Figure 1:
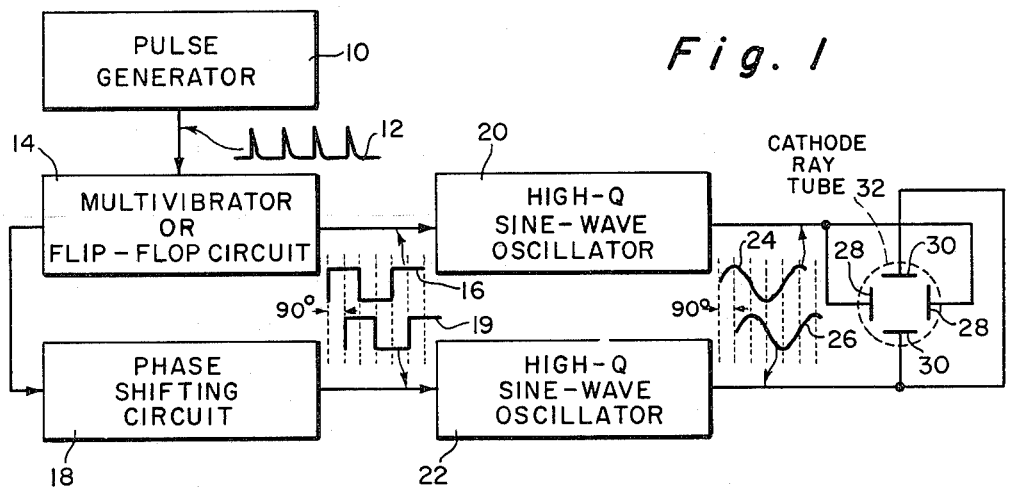
FIG. 1 is a block diagram of a sine-wave generating circuit designed in accordance with a preferred embodiment of the present invention.

Referring now to the drawing, there is shown in FIG. 1 a pulse generator 10 which may be of conventional design and which is adapted to develop a series of reference pulses 12 extending in a direction of positive polarity and having a constant repetition frequency. The actual frequency of these pulses 12 is not of any particular consequence as long as the time displacement therebetween does not vary significantly during the period that the apparatus of FIG. 1 is in operation. The pulses 12 are applied to a multivibrator, or flip-flop circuit, 14 which is, in effect, a symmetrical two-stage plate-coupled amplifier. One particularly suitable arrangement therefor will be set forth in conjunction with a description of the circuit illustrated in FIG. 2 of the drawings. It is only necessary to appreciate at this time that the energy output of the multivibrator 14 is of rectangular configuration, as illustrated by the wave form 16, and that each positive or negative excursion of the wave is in timed relationship with the reception by the multivibrator 14 of one of the reference pulses 12.

The rectangular wave 16 is applied both to a phase-shifting circuit 18 and to a sine-wave oscillator 20 having a relatively high Q-factor. The phase-shifting circuit 18 may be of any type known in the art which develops a 90° phase difference between the input wave thereto and the output wave therefrom. It may, for example, consist of a conventional R—C network, or, alternatively, an R—L combination in which an inductor is employed in place of a capacitor. In either case, the degree of phase shift (in this case 90°) may be accurately established and will normally remain fixed throughout the period during which the circuit of FIG. 1 is operational. The energy output of circuit 18 is thus the phase-shifted wave indicated by the reference numeral 19 in the drawing.

It has been stated that the rectangular wave 16 is applied to the sine-wave oscillator 20. In similar fashion, the rectangular wave 19 is applied to a second sine-wave oscillator 22 which may be of a type identical to oscillator 20. One form of oscillatory circuit that is especially suitable for the purpose will be described in connection with FIG. 3 of the drawings. The output of the unit 20 will be of sine-wave configuration, as indicated by the reference numeral 24 in the drawings, and the output wave 26 of unit 22 will be identical but phase-shifted by 90° with respect to wave 24. The latter is applied to one set of deflecting plates 28 of a cathode-ray tube, while the wave 26 is applied to the remaining set of deflecting plates 30. This results in a precisely circular trace of the electron scanning beam developed within the cathode-ray tube, the latter being illustrated only schematically in the drawing by the broken line 32.

Figure 2:
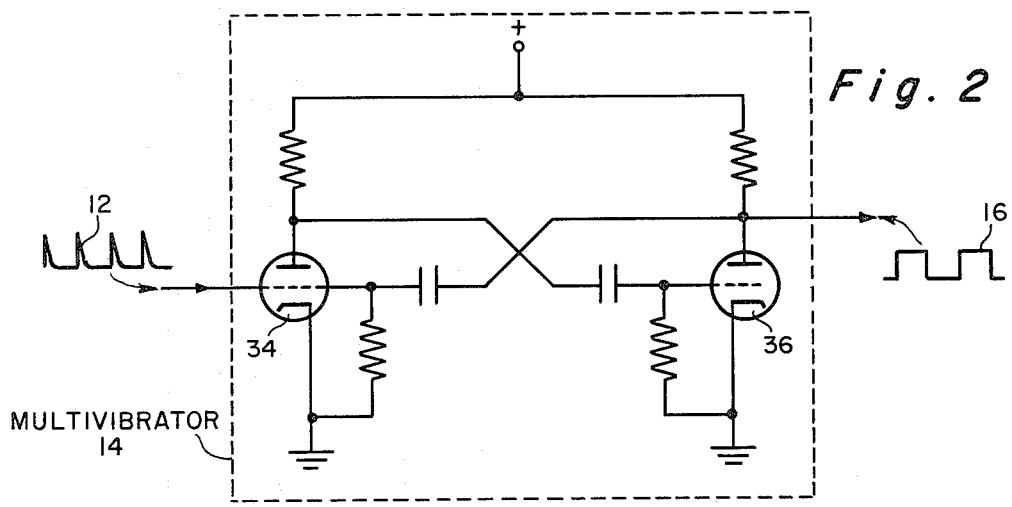
FIG. 2 is a schematic circuit diagram of a preferred form of multivibrator which may be employed in the circuit of FIG. 1.

The multivibrator, or flip-flop circuit, 14 of FIG. 1 may, if desired, take the form set forth in FIG. 2. This preferred arrangement consists of two electron discharge tubes 34 and 36 having a mutual plate-to-grid capacitive coupling. The triggering or synchronizing pulses 12 from the generator 10 are applied to the grid of tube 34, and the rectangular wave output is taken from the plate of tube 36. It is, of course, essential that the frequency of the synchronizing pulses 12 be higher than the natural free-running frequency of the multivibrator.

Figure 3:
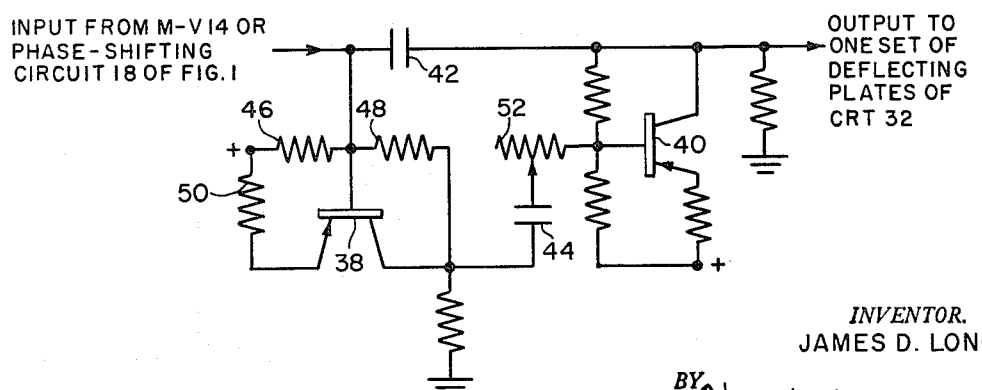
FIG. 3 is a schematic circuit diagram of a preferred form of high-efficiency oscillator which may be employed in the circuit of FIG. 1.

FIG. 3 illustrates one form of high-Q oscillator adapted to develop the sine-wave output shown by waveforms 24 and 26. For operating efficiency, as well as low power consumption, the oscillator is shown as being transistorized, but obviously electron discharge tubes may be utilized if desired. Two transistors 38 and 40 are so coupled that the rectangular input trigger waves 16 and 19 are not required to be of large amplitude. In order for oscillation to be maintained, the respective optimum values of coupling capacitors 42 and 44 are determined in the usual fashion in accordance with the repetition frequency of the rectangular wave 16 (or 19). Stabilization is achieved by means of resistances 46 and 48, while an additional resistor 50 not only provides degeneration for the emitter of transistor 38, but in addition serves to stabilize the circuit when the latter is subjected to variations in ambient temperature. Adjustment of potentiometer 52 enables the operating frequency of the oscillator to be varied within the design limits of the circuitry.

The sine-wave oscillator of FIG. 3 contains the required positive feedback to maintain continuous oscillations. Transistor 38 operates very nearly from saturation to cut-off, and the signal at the collector of this transistor is of the square-wave type. Because of the reactance of capacitor 44, the resistance of resistor 52, and the input impedance of transistor 40, the signal at the base of the latter element is very nearly a sine wave. The collector of transistor 40 is loaded by the input impedance of transistor 38 and by the output load. The equivalent load at the collector of transistor 40 is such that the quality of the output sine wave is improved—that is, distortion is held to a minimum. Unwanted high-frequency harmonics are attenuated because of the reactive impedance at the input to transistor 38 and because of the relatively high output impedance of transistor 40.

Resistor 52 is used to reduce the overall loop gain to one. If resistor 52 were shorted, an asymmetrical square wave output signal would result. Resistor 52 is necessary not only to reduce the overall loop gain, but also to aid in shaping the square-wave type signal at the collector of transistor 38 before it reaches the base electrode of transistor 40.

It should be recognized that while a 90° phase displacement of two sine-waves has been described to illustrate the principle of applicant's invention, nevertheless the concept, in its broadest sense, includes any frequency relationship between two sine-waves which is in the nature of a simple integral. Under such conditions, a stationary pattern, or Lissajou figure, will be produced, the configuration of which may yield significant information to an observer as to the frequency and/or phase qualities of one of the waves applied to a cathode-ray tube if the characteristics of the remaining waves are known.

Obviously many modifications and variations of the

I claim:

1. In a circuit for generating a pair of sine-wave voltages for respective application to the two sets of deflecting plates of a cathode-ray tube, the two said sine-wave voltages having a predetermined phase displacement therebetween, said circuit including a pulse generator for developing a series of pulses having a substantially constant repetition frequency, a flip-flop multivibrator designed to yield a periodically-varying wave output of essentially rectangular configuration, means for applying the pulses developed by said generator to trigger the said multivibrator and hence synchronize the output thereof at the said pulse repetition frequency, a phase-shifting circuit, a pair of high-Q sine-wave oscillators, means for applying the rectangular wave output of said multivibrator to one oscillator of said pair and also to the said phase-shifting circuit, means for applying the output of said phase-shifting circuit to the other oscillator of said pair, whereby both oscillators are synchronized in their operation due to the respective reception thereby of said rectangular waves, one of said rectangular waves being displaced in phase with respect to the other rectangular wave due to the action of said phase-shifting circuit, and means for applying the respective sine-wave outputs of said oscillators to the two sets of deflecting plates of said cathode-ray tube.

2. A sine-wave voltage generating circuit according to claim 1, in which each of said high-Q sine-wave oscillators includes a pair of transistors, the said rectangular wave being applied to the base electrode of one of said transistors and the output from said oscillator being derived from the collector electrode of the remaining transistor, the two transistors being so coupled that the base electrode of the transistor to which the said rectangular wave is applied is capacitatively connected to the collector electrode of the transistor from which the sine-wave output of the oscillator is obtained.

3. A sine-wave voltage generating circuit according to claim 2, in which the emitter electrode of the transistor to which the rectangular wave is applied is coupled through a resistance-capacitance network to the base electrode of the transistor from which the sine-wave output of the oscillator is obtained, the resistor of said resistance-capacitance network being adjustable to thereby vary the operating frequency of the oscillator.

References Cited in the file of this patent

UNITED STATES PATENTS

| | | |
|---|---|---|
| 2,312,761 | Hershberger | Mar. 2, 1943 |
| 2,421,312 | Bobb | May 27, 1947 |
| 2,449,792 | Snyder | Sept. 21, 1948 |
| 2,457,580 | Mayer | Dec. 28, 1948 |
| 2,632,865 | Hales | Mar. 24, 1953 |
| 2,921,192 | Casey et al. | Jan. 12, 1960 |
| 2,946,899 | Day | July 26, 1960 |